(12) United States Patent
Sutanto et al.

(10) Patent No.: US 8,327,332 B2
(45) Date of Patent: Dec. 4, 2012

(54) SEAMLESS DEBUGGING AMONG DIFFERENT APPLICATION VIEWS

(75) Inventors: Herry Sutanto, Redmond, WA (US); Kushal Jagdish Shah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1128 days.

(21) Appl. No.: 12/203,008

(22) Filed: Sep. 2, 2008

(65) Prior Publication Data
US 2010/0058297 A1 Mar. 4, 2010

(51) Int. Cl.
*G06F 9/44* (2006.01)

(52) U.S. Cl. ........ 717/124; 717/105; 717/125; 717/130; 717/132

(58) Field of Classification Search .................. 717/105, 717/124, 125, 130, 132
See application file for complete search history.

(56) References Cited

U.S. PATENT DOCUMENTS

| | | | | |
|---|---|---|---|---|
| 7,221,377 B1* | 5/2007 | Okita et al. | ................... | 345/629 |
| 7,299,454 B2 | 11/2007 | Pugh et al. | | |
| 7,519,960 B2* | 4/2009 | Mei et al. | ...................... | 717/129 |
| 7,941,783 B1* | 5/2011 | Kishnani et al. | .............. | 717/100 |
| 7,979,847 B2* | 7/2011 | Danton et al. | ................ | 717/125 |
| 2004/0168155 A1* | 8/2004 | O'Farrell et al. | ............. | 717/129 |
| 2005/0216892 A1* | 9/2005 | Horton et al. | ................ | 717/126 |
| 2005/0216893 A1* | 9/2005 | Horton et al. | ................ | 717/126 |
| 2005/0246690 A1* | 11/2005 | Horton et al. | ................ | 717/125 |
| 2006/0074733 A1 | 4/2006 | Shukla et al. | | |
| 2006/0074736 A1 | 4/2006 | Shukla et al. | | |
| 2006/0212842 A1 | 9/2006 | Gossman et al. | | |
| 2006/0288332 A1 | 12/2006 | Sagar et al. | | |
| 2007/0276692 A1 | 11/2007 | Mei et al. | | |
| 2008/0155330 A1* | 6/2008 | Van Wyk et al. | ................ | 714/35 |

OTHER PUBLICATIONS

Lyn Robison, The Micrpspft .NET Framework 3.0: Building Next-Generation Windows Applications, Version 1, Oct. 16, 2007.*
The New Iteration: How XAML Transform the Collaboration between Designer and Developer in Window Presentation Foundation. 18 Pages, Dec. 13, 2007.
Rygg, Asbjorn; Sumitomo, Jiro; Roe, Paul. A Unified Model of Batch and Interactive Scientific Workflow and its Implementation using Windows Workflow. 2006. 7 Pages.
Developing Workflow Solutions with SharePoint Server 2007 and Windows Workflow Foundation. 14 Pages.
Box, Don; Shukla, Dharma. Simplify Development with the Declarative Model of Window Workflow Foundation. 9 Pages, 2008.

\* cited by examiner

*Primary Examiner* — Phillip H Nguyen
(74) *Attorney, Agent, or Firm* — Workman Nydegger

(57) ABSTRACT

In an embodiment, a computer system initiates an application debugging process for an application that is to be debugged and maps runtime object elements of the application to both code elements and graphical elements. The computer system appends portions of software code to each runtime object element so that a runtime event is outputted indicating which corresponding graphical or code element is currently being processed. The computer system accesses the outputted runtime events to determine which graphical or code element is currently being processed and, based on the accessed outputted runtime events and based on the mappings, displays the elements currently being debugged in a first view. The computer system, based on the accessed outputted runtime events and based on the mappings, switches views from the first view to a second view without restarting the application debugging process for the application being debugged.

20 Claims, 4 Drawing Sheets

SEAMLESS DEBUGGING AMONG DIFFERENT APPLICATION VIEWS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications and functions are designed using an integrated development environment (IDE). IDE's provide a variety of different tools that a software developer can use to write a working application. For instance, software developers may use an IDE's debugging features to determine where problems may exist in the code. A developer may be able to set breakpoints at certain positions in the code, and execute the application step by step until a breakpoint is hit. This allows the developer to see at each step what is happening, and where the potential bugs may lie.

In some cases, a developer may be able to draft code by linking together workflow code modules. Such modules may have a defined functionality, and programming interfaces that explain how the modules are to be used in combination with other modules. Thus, using an IDE, a developer may be able to string together multiple workflow code modules to create an application or function. In such cases, or in other cases where declarative code is used, workflow code modules and other declarative code typically have corresponding code portions, which may be visible in another view of the IDE. For instance, a developer may perform a large portion of the software development in one view, and then verify his or her work in the other view.

The ability to switch views to inspect the code may be more advantageous during the actual debugging process. For example, during execution of the application or function that is being debugged, the developer may wish to see the progression of a code step in one view and immediately switch to another view while the application is still being debugged.

BRIEF SUMMARY

Embodiments described herein are directed to seamlessly switching between debugger display views during debugging of an application. In one embodiment, a computer system initiates an application debugging process for an application that is to be debugged. The computer system maps runtime object elements of the application to both code elements and graphical elements, so that there is a one-to-one correspondence between the runtime object elements and the code elements and between the runtime object elements and the graphical elements.

The computer system appends portions of software code to each runtime object element, so that, upon execution of the software code during runtime, a runtime event is outputted indicating which corresponding graphical or code element is currently being processed. The computer system accesses the outputted runtime events to determine which graphical or code element is currently being processed and, based on the accessed outputted runtime events and based on the mappings, displays the elements currently being debugged in a first view. The computer system, based on the accessed outputted runtime events and based on the mappings, switches views from the first view to a second view without restarting the application debugging process for the application being debugged.

In another embodiment, a computer system maps, in a first mapping, XAML elements displayable in a XAML code view to workflow elements displayable in a workflow view, such that a one-to-one correspondence is established between the code elements and the graphical elements. The computer system also maps, in a second mapping, runtime object elements to either or both of the XAML code elements and the workflow elements, such that there is a one-to-one correspondence between both the runtime object elements and the XAML code elements and between the runtime object elements and the workflow elements. The computer system appends portions of intermediate language code to each runtime object element, so that, upon execution of the intermediate language code during runtime, a runtime event is outputted indicating which workflow or XAML code element is currently being processed.

The computer system accesses the outputted runtime events to determine which workflow or XAML code element is currently being processed and, based on the accessed outputted runtime events and based on the second mappings, displays, in a currently displayed view, the elements currently being debugged in either or both of the XAML code view and the workflow view, where the elements currently being debugged are adorned such that the elements are distinguishable from lines that are not being debugged. The computer system, based on the accessed outputted runtime events and based on the first mappings, switches views from the currently displayed view to either or both of a XAML code view and a workflow view without restarting the application debugging process for the application being debugged.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
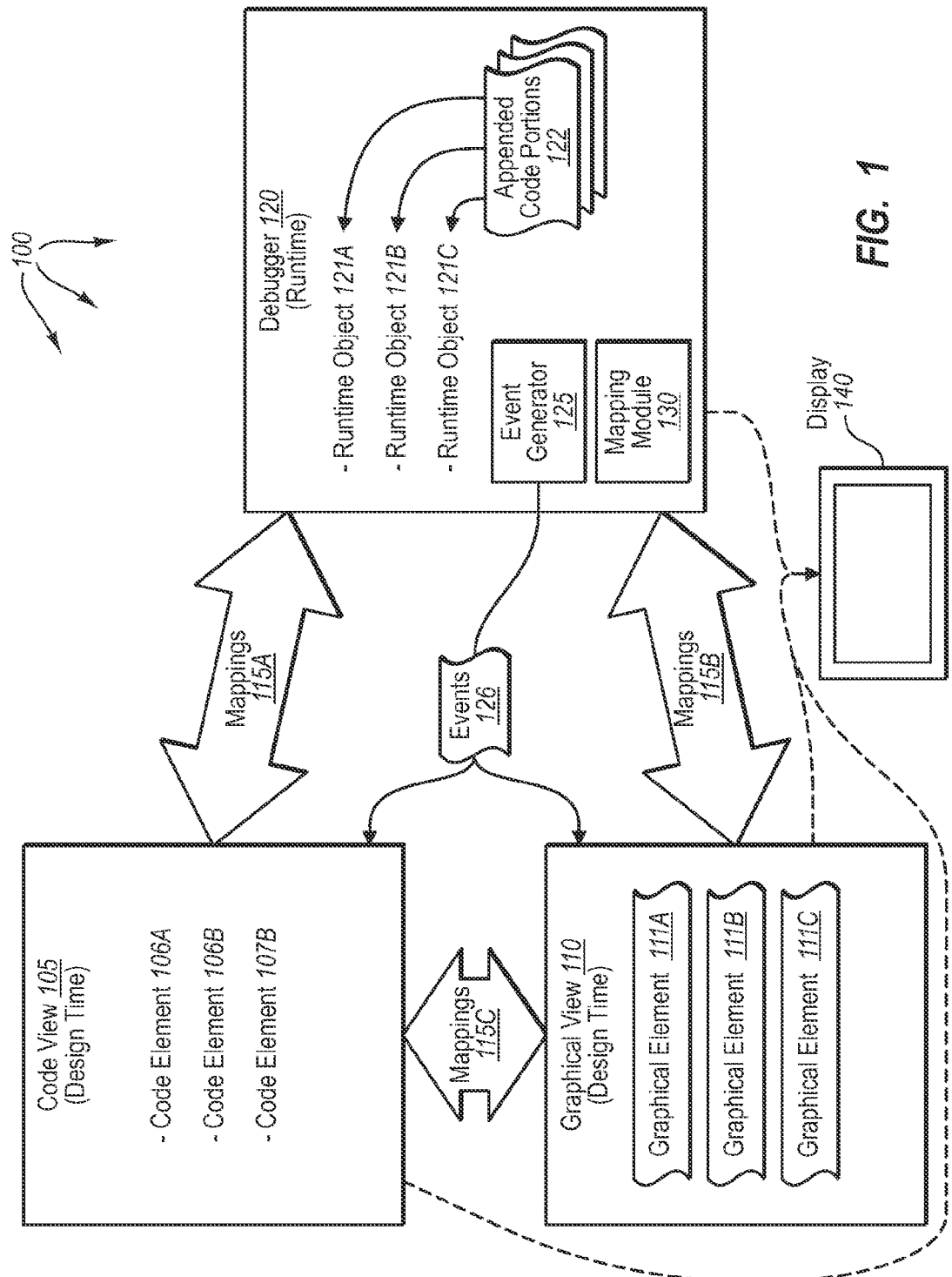
FIG. 1 illustrates a computer architecture in which embodiments of the present invention may operate including seamlessly switching between debugger display views during debugging of an application.

Embodiments described herein are directed to seamlessly switching between debugger display views during debugging of an application. In one embodiment, a computer system initiates an application debugging process for an application that is to be debugged. The computer system maps runtime object elements of the application to both code elements and graphical elements, so that there is a one-to-one correspondence between the runtime object elements and the code elements and between the runtime object elements and the graphical elements.

The computer system appends portions of software code to each runtime object element, so that, upon execution of the software code during runtime, a runtime event is outputted indicating which corresponding graphical or code element is currently being processed. The computer system accesses the outputted runtime events to determine which graphical or code element is currently being processed and, based on the accessed outputted runtime events and based on the mappings, displays the elements currently being debugged in a first view. The computer system, based on the accessed outputted runtime events and based on the mappings, switches views from the first view to a second view without restarting the application debugging process for the application being debugged.

In another embodiment, a computer system maps, in a first mapping, XAML elements displayable in a XAML code view to workflow elements displayable in a workflow view, such that a one-to-one correspondence is established between the code elements and the graphical elements. The computer system also maps, in a second mapping, runtime object elements to either or both of the XAML code elements and the workflow elements, such that there is a one-to-one correspondence between both the runtime object elements and the XAML code elements and between the runtime object elements and the workflow elements. The computer system appends portions of intermediate language code to each runtime object element, so that, upon execution of the intermediate language code during runtime, a runtime event is outputted indicating which workflow or XAML code element is currently being processed.

The computer system accesses the outputted runtime events to determine which workflow or XAML code element is currently being processed and, based on the accessed outputted runtime events and based on the second mappings, displays, in a currently displayed view, the elements currently being debugged in either or both of the XAML code view and the workflow view, where the elements currently being debugged are adorned such that the elements are distinguishable from lines that are not being debugged. The computer system, based on the accessed outputted runtime events and based on the first mappings, switches views from the currently displayed view to either or both of a XAML code view and a workflow view without restarting the application debugging process for the application being debugged.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes various modules which may or may not be running on the same computer system. In some embodiments, FIG. 1 may be illustrative of an integrated development environment (IDE), in which multiple views may be displayed, either alone or in combination with other views. For example, code view 105 may be displayed alone, or in combination with graphical view 110 (e.g. in a split-screen scenario). Similarly, graphical view 110 may be displayed alone or in combination with code view 105. Although a code view and a graphical view are illustrated in FIG. 1, it should be understood that many different views may be implemented. These views may be proprietary or public and may be fully customizable by the user.

Code view 105 may be displayed during design time. Design time, as the term is used herein, refers to the period in which a developer or other computer user is writing code or otherwise combining elements to create a software application or function. Runtime, as the term is used herein (e.g. in connection with debugger 120), refers to the period in which an application or function is being executed and/or debugged. Runtime may be distinguished from design time in that the application or function is not executed or debugged during design time.

Each view may include a variety of elements. Some (or all) of these elements may correspond to other elements in other views. Mappings 115A, 115B and 115C may be used to track connections between corresponding elements. For example, in code view 105, code element 106A may be displayed to a user (e.g. a software developer). Code element 106A may correspond to graphical element 111A. This correlation may be indicated by and stored in mappings 115C. Thus, in situations where a developer is writing code (e.g. code element 106A), and the developer wishes to switch views to a graphical or workflow view, mappings may indicate to the computer system how to show each code element in a graphical view. This concept will be explained in greater detail below.

Mappings 115A and 115B may be used to track connections between runtime objects and corresponding code and/or graphical elements. For example, during runtime, debugger 120 may create a variety of runtime objects (e.g. 121A, 121B, 121C and others) which are executed during the debugging process. The computer system on which the IDE is running may append code portions 122 to one or more of the objects so that when they are executed, an event generator 125 that is part of the debugger outputs events 126 indicating which code or graphical elements were executed, based on mappings 115A and/or 115B. This allows a user to seamlessly switch between views while an application or function is being debugged. This and other concepts will be explained in greater detail below with regard to FIGS. 2 and 3.

Figure 2:
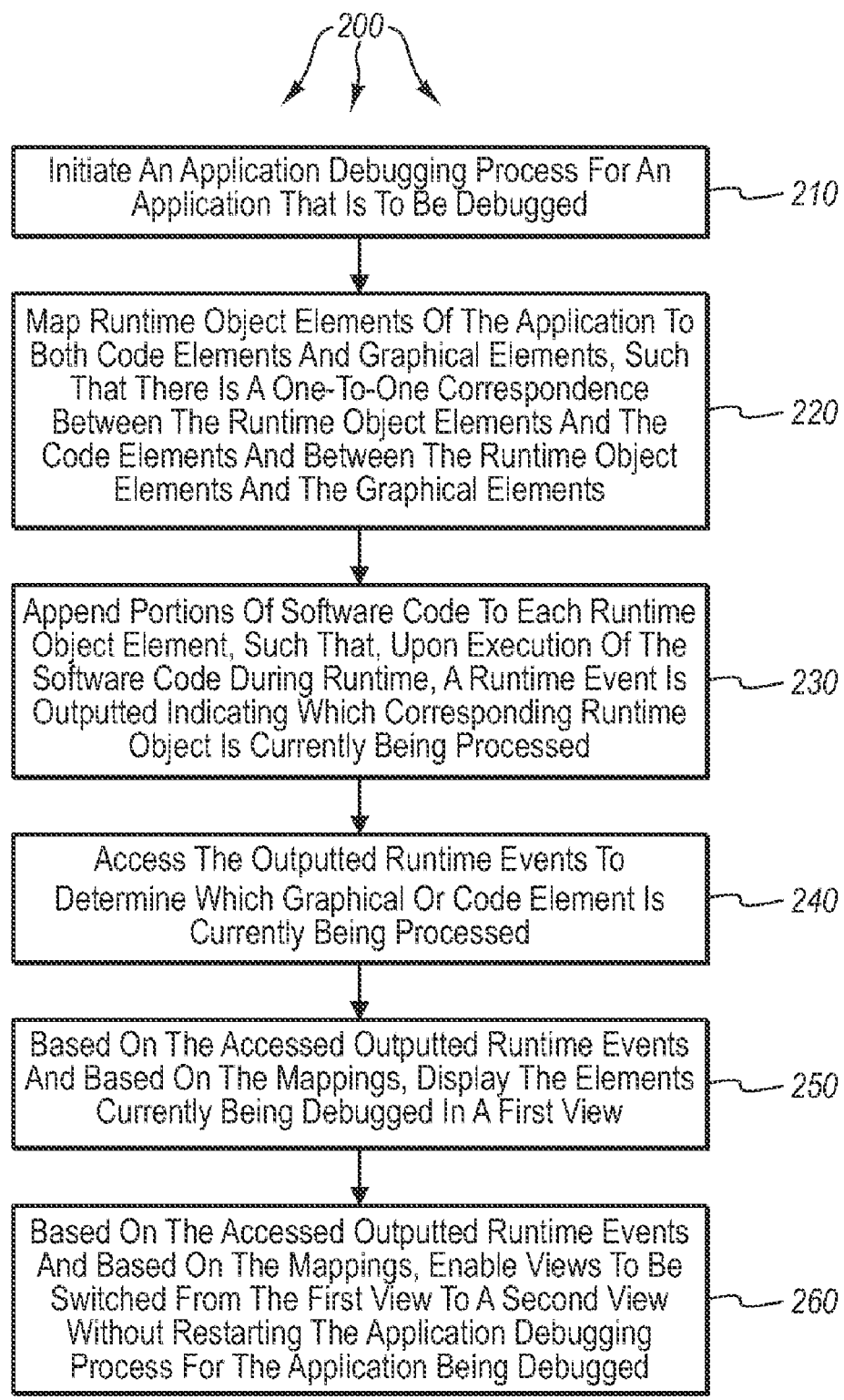
FIG. 2 illustrates a flowchart of an example method for seamlessly switching between debugger display views during debugging of an application.

FIG. 2 illustrates a flowchart of a method 200 for seamlessly switching between debugger display views during debugging of an application. The method 200 will now be described with frequent reference to the components and data of environment 100.

Method 200 includes an act of initiating an application debugging process for an application that is to be debugged (act 210). For example, either a computer system or a computer system user may initiate application debugger 120 to debug a software application or function. For instance, an application may have code elements 106A-106C. In some cases, these code elements may correspond to runtime objects 121A-121C, respectively. The connections between these elements may be stored in mappings 115A. These runtime objects may be executed with the intent of debugging the code elements. The debugging process may include all the elements conventionally associated with debugging such as breakpoints, parent function indicators, and other pieces of functionality.

In some embodiments, element mapping involves analyzing code and graphical elements to determine which code and graphical elements are equivalent. As used herein, the term equivalent may refer to elements that are substantially equivalent or substantially related to each other. Code and/or graphical elements may mapped to runtime objects and/or to other code or graphical objects in a one-to-one or one-to-many fashion. That is, one code element may be equivalent to or correspond to a single runtime object or multiple objects. Similarly, one graphical element may be equivalent to or correspond to a single code element or multiple code elements. It should be understood that a variety of different element mapping combinations are possible, and that the examples provided herein are not intended to limit potential element mappings. As mentioned above, many different views may be used, and in different views, the elements' correspondence with other elements may be determined manually by a user or automatically by the computer system.

Determining which code and graphical elements are equivalent may include querying a code management engine to determine, for a given portion of code, which corresponding visual element is to be presented to the user. For instance, in an IDE designed to allow code development using workflows, a developer may be able to design an application or function by stringing or piecing together various workflow portions. Each workflow portion represents or includes an underlying portion of code. Thus, a developer may be able to design a software function without a great deal of knowledge about how the code works. However, some developers may find it advantageous to design an application using multiple different views, including a code view and a workflow view. Thus, similar elements are mapped to each other so that while the view may be switched, the same elements are still displayed.

Method 200 includes an act of mapping one or more runtime object elements of the application to both code elements and graphical elements, such that there is a one-to-one correspondence between the runtime object elements and the code elements and between the runtime object elements and the graphical elements (act 220). For example, mapping module (130) may map one or more of runtime object elements 121A-121C of an application to both code elements (e.g. 106A-106C identified in mappings 115A) and graphical elements (e.g. 111A-111C identified in mappings 115B), such that there is one-to-one correspondence between the runtime object elements and the code elements, and between the runtime object elements and the graphical elements. In some cases, mappings 115A may include specific code line numbers for the corresponding code elements in the code view 105. Similarly, mappings 115B may include specific workflows for the corresponding graphical elements in the graphical view 110.

Method 200 includes an act of appending one or more portions of software code to each runtime object element, such that, upon execution of the software code during runtime, a runtime event is outputted indicating which corresponding graphical or code element is currently being processed (act 230). For example, the computer system may append one or more appended code portions 122 to one or more of runtime objects 121A-121C, such that, upon execution of the runtime objects during runtime, event generator 125 may output an event 126 indicating which corresponding graphical or code element is currently being processed. Thus, in some embodiments, the computer system on which the IDE is running (or the IDE itself) may append portions of software code that cause events to be generated. Such events may identify which runtime objects (and from the mappings, which corresponding elements) are currently being executed. In some cases, the appended code may be intermediate language (IL) code.

Customizable triggers may be added as part of the appended code portions. Such triggers may be designed or customized by a user such that events are generated at customizable times or for customizable reasons. For instance, a user might want to know when a plurality or combination of runtime objects are being executed. Additionally or alternatively, a user may want to cause an event to be generated midway (or some other portion of the way) through execution of a runtime object. For example, a user might design a trigger to cause an event to be generated at a breakpoint placed within a runtime object. Other examples and user customizations are also possible.

Method 200 includes an act of accessing the outputted runtime events to determine which graphical or code element is currently being processed (act 240). For example, either or both of code view 105 and graphical view 110 of the IDE may access events 126 to determine which graphical (111A-111C) or code (106A-C) element(s) is/are currently being processed. Thus, any of the IDE or other application views may use events 126 to identify which runtime objects are currently being processed. As a result, and because of the mappings (115A & 115B), the views may be configured to display those elements in the graphical/code view that are currently being debugged by debugger 120.

Method 200 includes, based on the accessed outputted runtime events and based on the mappings, an act of displaying the elements currently being debugged in a first view (act 250). For example, based on accessed outputted runtime events 126, and based on mappings 115A/115B, display (140) may display the elements currently being debugged in a first view (e.g. code view 105, graphical view 110, or some other view). Thus, while debugger 120 is executing one or more runtime objects, event generator 125 is outputting events identifying which corresponding code and/or graphical objects are being executed. In either or both of views 105 and 110, an indication of which elements are being executed may be displayed. In some cases, such a display may include highlighting those code elements currently being debugged in the code view. The highlighting may include coloring, bolding, italicizing, or any other type of formatting designed to highlight or set apart those elements being debugged from those elements that are not. Highlighting may also be applied to graphical elements currently being debugged in the graphical view.

Developers, in some cases, may wish to begin developing a software application using a workflow view. Then, either during or before debugging, the developer may switch from the workflow (graphical) view to a code view to make changes to the code displayed in the code view. After making changes to the code, the user may initiate debugging (if it was not previously initiated) or switch to the graphical or another view. The reverse case may also be performed, where the user begins in the code view and switches to a graphical view to develop a program using workflows or other graphical elements.

While a user is viewing elements in a given view, those corresponding elements (as indicated by mappings 115C) or code constructs may be updated in the other views. For example, code elements added in the code view may automatically be added in the graphical view, and vice versa. These added code constructs may be immediately viewable upon switching views, even when the debugger is still processing the application. It should be noted that any type of code or graphical element modification (including adding, overwriting, deleting or any other type of modification) may similarly be automatically updated in other views as changes are made to a first view.

Method 200 includes, based on the accessed outputted runtime events and based on the mappings, an act of switching views from the first view to a second view without restarting the application debugging process for the application being debugged (act 260). For example, based on accessed outputted runtime events 126 and based on the mappings, a developer may switch views from code view 105 to graphical view 110 (or vice versa) without restarting the application debugging process for the application being debugged. Thus, while a developer is writing code or combining graphical objects to create a working application or function, a developer may switch views from one to the other. Moreover, the developer may initiate the debugging process and, based on the mappings and the outputted events, may seamlessly switch views while the application is being debugged. When the views are being used, it is likely that IDE tools will be displayed in those views. Such tools may be carried over during the switch, such that at least some of the tools available in the code/graphical view are available in the other view when the view is switched by the user. It should be noted that a user may switch between any number of views, and between various types of views. Updated mappings may be created for any new views with new or different elements. Using these updated mappings, views may be switched and the same or corresponding elements will be displayed in the "switched to" view.

Figure 3:
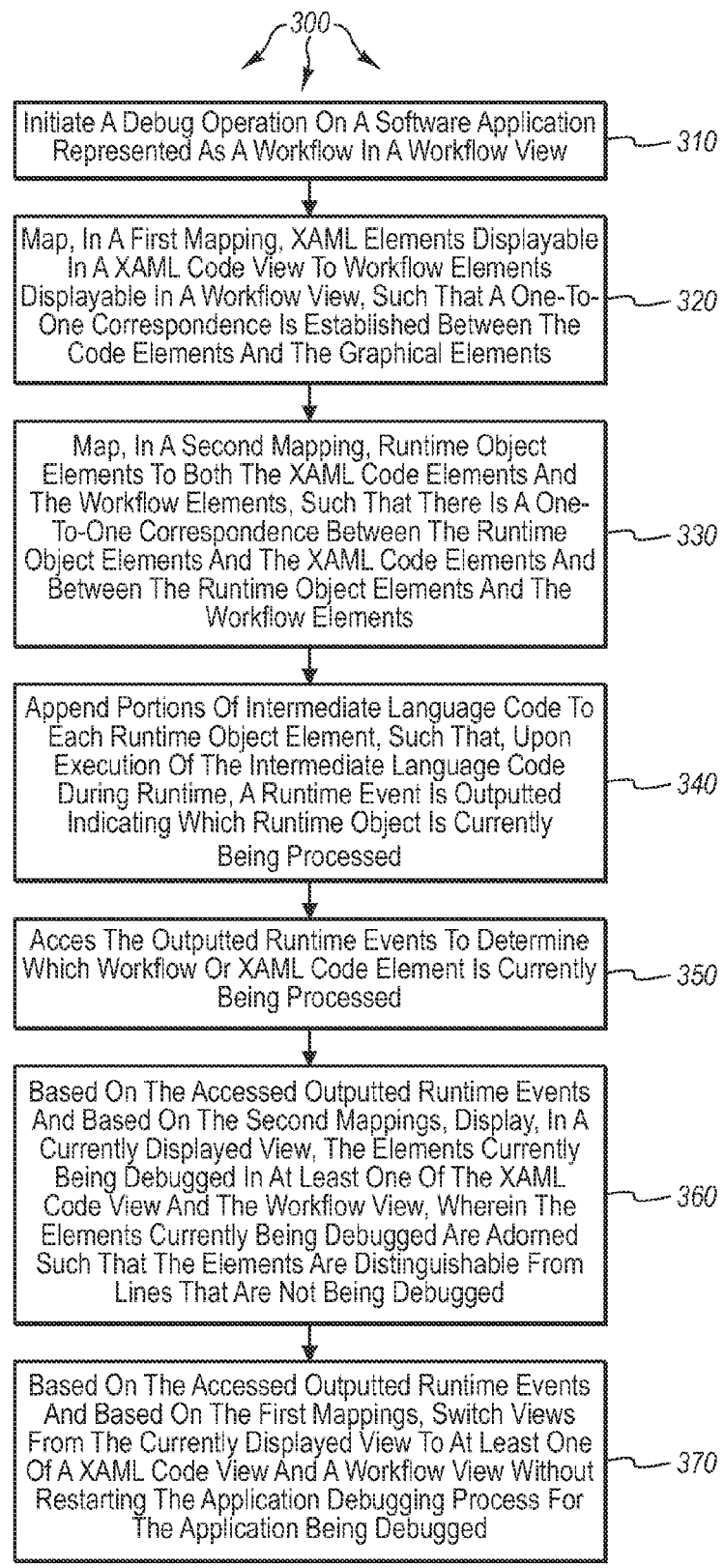
FIG. 3 illustrates a flowchart of another example method for seamlessly switching between debugger display views during debugging of an application.

FIG. 3 illustrates a flowchart of a method 300 for seamlessly switching between debugger display views during debugging of an application. The method 300 will now be described with frequent reference to the components and data of environment 100.

Method 300 includes an act of initiating a debug operation on a software application represented as a workflow in a workflow view (act 310). For example, a software developer may initiate debugger 120 to debug a software application represented as a workflow in workflow view 110. Debugger 120 may be configured to convert workflow elements into runtime objects and execute those runtime objects as part of the debugging process.

Method 300 includes an act of mapping, in a first mapping, one or more (Extensible Application Markup Language) XAML elements displayable in a XAML code view to one or more workflow elements displayable in a workflow view, such that a one-to-one correspondence is established between the XAML elements and the workflow elements (act 320). For example, mapping module (130) may map one or more XAML elements (e.g. code elements 106A-C) in a XAML code view (e.g. code view 105) to one or more workflow elements (e.g. graphical elements 111A-C) displayable in a workflow view, such that a one-to-one correspondence is established between the XAML code elements and the workflow elements. This correspondence may be stored in mappings 115C.

Method 300 includes an act of mapping, in a second mapping, one or more runtime object elements to one or more of both the XAML code elements and the workflow elements, such that there is a one-to-one correspondence between the runtime object elements and the XAML code elements and between the runtime object elements and the workflow elements (act 330). For example, mapping module (130) may map one or more of runtime objects 121A-C to either or both of XAML code elements 106A-C and workflow elements 111A-C, such that there is a one-to-one correspondence between the runtime object elements and the XAML code elements and between the runtime object elements and the workflow elements. It should be noted that although code elements 106A-C and graphical elements 111A-C are referred to herein as XAML and workflow elements, respectively, the code elements can be any type of code elements and graphical elements can be any type of graphical code drafting elements. The connections between XAML elements and runtime objects may be stored in mappings 115A and the connections between workflow elements and runtime objects may be stored in mappings 115B. In some cases, it may be possible to use only two sets of mappings and extrapolate the third based on the other two. For example, once mappings 115A and 115B are established, mappings 115C may be deduced from the connections of the 115A & B mappings.

Method 300 includes an act of appending one or more portions of intermediate language (IL) code to each runtime object element, such that, upon execution of the intermediate language code during runtime, a runtime event is outputted indicating which workflow or XAML code element is currently being processed (act 340). For example, debugger 120 may append one or more appended code portions 122 of IL code to at least some of runtime object elements 121A-C such that, upon execution of the IL code during runtime, runtime events 126 may be outputted indicating which workflow or XAML code element(s) is/are currently being processed during the debugging operation. The IL code may be appended to the runtime objects during runtime. In some cases, upon determining that the debugging is completed, the appended IL code may be removed from the runtime object elements.

Method 300 includes an act of accessing the outputted runtime events to determine which workflow or XAML code element is currently being processed (act 350). For example, either of XAML code view 105 or workflow graphical view 110 may access outputted runtime events 126 to determine which XAML or workflow elements are currently being processed by debugger 120. Mappings 115C may be used to identify at least one specific workflow element corresponding to an XAML element. Similarly, mappings 115C may be used to identify at least one specific line of XAML code corresponding to a workflow element.

Method 300 includes an act of based on the accessed outputted runtime events and based on the second mappings, an act of displaying, in a currently displayed view, the elements currently being debugged in at least one of the XAML code view and the workflow view, wherein the elements currently being debugged are adorned such that the elements are distinguishable from lines that are not being debugged (act 360). For example, based on runtime events 126 and based on either mappings 115A or 115B, display (140) may display, in a currently displayed view, which elements are currently being debugged in at least one XAML code view 105 and workflow graphical view 110, where the elements currently being debugged are adorned (highlighted) so that the elements are distinguishable from elements that are not being debugged. Thus, for instance, if workflow graphical element 111B was currently being debugged, element 111B may be adorned or highlighted in workflow graphical view 110. Furthermore, if the developer switches views while workflow graphical element 111B is adorned, the adornments will carry over such that the XAML code element (e.g. code element 106B) is similarly adorned.

Other elements may additionally or alternatively be displayed with highlights. For example, the IDE application may be configured to identify one or more parent functions of a function currently being debugged and adorn the one or more identified parent functions, such that the parent functions are distinguishable from other less related or unrelated functions. Moreover, a workflow engine may be queried to determine which corresponding visual element(s) is/are currently being shown to the user. Upon receiving a response to the query, those elements indicated in the query may be similarly highlighted.

Method 300 includes an act of, based on the accessed outputted runtime events and based on the first mappings, an act of switching views from the currently displayed view to at least one of a XAML code view and a workflow view without restarting the application debugging process for the application being debugged (act 370). For example, based on runtime events 126 and at least one of mappings 115A-C, views may be switched from the currently displayed view (either XAML code view 105, workflow graphical view 110, or another view) to the XAML code view, the workflow view or another view without restarting the application debugging process for the application being debugged.

Figure 4:
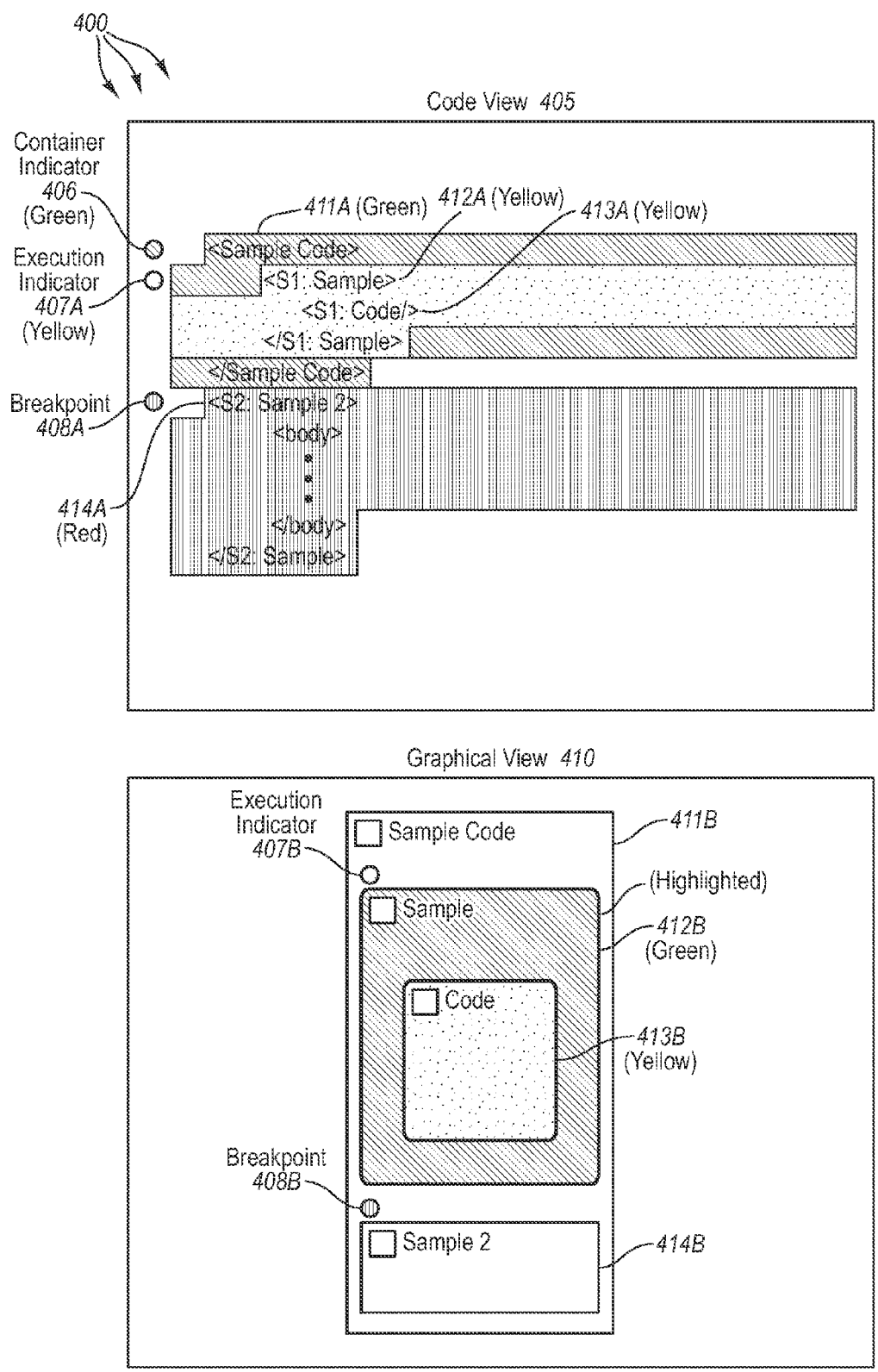
FIG. 4 illustrates an example embodiment of a display with different views.

For instance, as illustrated architecture 400 of FIG. 4, in some embodiments, code view 405 (which may correspond to code view 105 of FIG. 1) may include a portion of software code such as XAML code. Different code elements may be highlighted with a different color or shading to indicate various operations. For example, code element 411A may be highlighted with a green color and may include a container indicator 406 indicating that code element 411A is a parent function for other functions. As will be understood, any type, color, font, shape or other form of highlighting may be used. Code elements 412A & 413A may be highlighted with a yellow color and may have a corresponding execution indicator 407A indicating that these code elements are currently being executed. Code element 414A and its code body may be highlighted red to indicate that breakpoint 408A has stopped execution at that point in the code.

Graphical view 410 (which may correspond to graphical view 110 of FIG. 1) may include graphical elements corresponding to the code elements of code view 405. For example, graphical element (e.g. workflow) 411B may correspond to code element 411A and may similarly be highlighted green. Similarly, graphical elements 412B & 413B may correspond to code element 412A & 413A, respectively, and may thus be highlighted yellow, indicating that these graphical elements are currently being processed. This may also be indicated by execution indicator 407B, which may also be highlighted yellow. Graphical element 414B may correspond to code element 414A and may be highlighted red indicating that execution has stopped at breakpoint 408B, which corresponds to breakpoint 408A. Thus, while the application is being debugged, the portions being executed (in this embodiment, the yellow highlighted portions) may be indicated to the user in either the graphical or the code views. Similarly, other elements such as breakpoints, parent containers or any other operations may be indicated to the user in either or both views. In some embodiments, the user may be able to select and customize which elements are highlighted and how the highlighting is to be carried out.

Thus, as runtime objects are processed during execution of the application, events are output identifying which objects are being processed. Because of the mappings between the various corresponding elements, multiple IDE views can be used to display graphical, code or other elements, and allow the user to switch between views while the debugger is debugging the application. Moreover, when views are switched, any element highlighting will carry over into the corresponding elements of the other view.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for seamlessly switching between debugger display views during debugging of an application in a computer network environment including a plurality of computing system, the method comprising:
   initiating an application debugging process for an application that is to be debugged;
   mapping one or more runtime object elements of the application to both code elements and graphical elements, such that there is a one-to-one correspondence between the runtime object elements and the code elements and between the runtime object elements and the graphical elements;
   appending one or more portions of software code to each runtime object element, such that, upon execution of the one or more portion of software code during runtime, a runtime event is outputted indicating which corresponding graphical or code element is currently being processed;
   accessing the outputted runtime events to determine which graphical or code element is currently being processed;
   based on the accessed outputted runtime events and based on the mapping, displaying the graphical elements and code elements currently being debugged in a first view; and
   based on the accessed outputted runtime events and based on the mapping, switching views from the first view to a second view without restarting the application debugging process for the application being debugged.

2. The method of claim 1, wherein the displaying the graphical elements and code elements currently being debugged in the first view further comprises highlighting those code elements currently being debugged in the code view.

3. The method of claim 1, wherein the displaying the graphical elements and code elements currently being debugged in the first view further comprises highlighting those graphical elements currently being debugged in the graphical view.

4. The method of claim 2, further comprising allowing a computer user to make changes to the code displayed on the code view display.

5. The method of claim 3, wherein code constructs added in the code view are automatically added in the graphical view.

6. The method of claim 5, wherein the added code constructs are immediately viewable upon switching views, even when the debugger is still running.

7. The method of claim 1, wherein mapping comprises analyzing code and graphical elements to determine which code and graphical elements are equivalent.

8. The method of claim 7, wherein determining which code and graphical elements are equivalent comprises querying a code management engine to determine, for a given portion of code, which corresponding visual element is to be presented to the user.

9. The method of claim 1, wherein each of the tools available in the code view is available in the graphical view when the current view is switched.

10. The method of claim 1, wherein code constructs modified in the code view are automatically modified in the graphical view.

11. The method of claim 1, wherein the mappings include specific code line numbers for the corresponding code elements in the code view.

12. The method of claim 1, further comprising, based on the accessed outputted runtime events and based on the mapping, switching views from at least one of the first view and the second view to a third view without restarting the application debugging process for the application being debugged.

13. A method for seamlessly switching between debugger display views during debugging of an application in a computer network environment including a plurality of computing systems, the method comprising:
   initiating a debug operation on a software application represented as a workflow in a workflow view;
   mapping, in a first mapping, one or more Extensible Application Markup Language (XAML) code elements displayable in a XAML code view to one or more workflow elements displayable in a workflow view, such that a one-to-one correspondence is established between the XAML elements and the workflow elements;
   mapping, in a second mapping, one or more runtime object elements to one or more of both the XAML code elements and the workflow elements, such that there is a one-to-one correspondence between the runtime object elements and the XAML code elements and between the runtime object elements and the workflow elements;
   appending one or more portions of intermediate language code to each runtime object element, such that, upon execution of the one or more portions of intermediate language code during runtime, a runtime event is outputted indicating which workflow or XAML code element is currently being processed;
   accessing the outputted runtime events to determine which workflow or XAML code element is currently being processed;
   based on the accessed outputted runtime events and based on the second mapping, displaying, in a currently displayed view, the workflow elements and code elements currently being debugged in at least one of the XAML code view and the workflow view, wherein the workflow elements and code elements currently being debugged are adorned such that the workflow elements and code elements are distinguishable from lines that are not being debugged; and
   based on the accessed outputted runtime events and based on the first mapping, switching views from the currently displayed view to at least one of the XAML code view and the workflow view without restarting the application debugging process for the application being debugged.

14. The method of claim 13, further comprising:
   identifying one or more parent functions of a function currently being debugged; and
   adorning the one or more identified parent functions, such that the parent functions are distinguishable from less related or unrelated functions.

15. The method of claim 13, wherein any adornments applied to the current view are carried over and applied to the switched view.

16. The method of claim 13, further comprising querying a workflow engine which corresponding visual element is currently being shown to the user.

17. The method of claim 13, wherein the intermediate language code is appended to the runtime objects at runtime.

18. The method of claim 13, wherein the mappings identify at least one specific workflow element corresponding to an XAML element.

19. The method of claim 13, further comprising removing the appended one or more portion of intermediate language code upon determining that debugging is completed.

20. A computer system comprising the following:
one or more processors;
system memory;
one or more computer-readable media having thereon computer-executable instructions that, when executed by the one or more processors, causes the computing system to perform a method for seamlessly switching between debugger display views during debugging of an application, the method comprising the following:
 mapping, in a first mapping, one or more code elements displayable in a code view to one or more graphical elements displayable in a graphical view, such that a one-to-one correspondence is established between the code elements and the graphical elements;
 mapping, in a second mapping, one or more runtime object elements to one or more of both the code elements and the graphical elements, such that there is a one-to-one correspondence between the runtime object elements and the code elements and between the runtime object elements and the graphical elements;
 appending one or more portions of intermediate language code to each runtime object element, such that, upon execution of the one or more portion of intermediate language code during runtime, a runtime event is outputted indicating which graphical or code element is currently being processed;
 accessing the outputted runtime events to determine which graphical or code element is currently being processed;
 based on the accessed outputted runtime events and based on the second mapping, displaying, in a currently displayed view, the graphical elements and code elements currently being debugged in at least one of the code view and the graphical view; and
 based on the accessed outputted runtime events and based on the first mapping, switching views from the currently displayed view to at least one of the code view and the graphical view without restarting the application debugging process for the application being debugged.

* * * * *